US006976913B2

(12) United States Patent
Duquesne et al.

(10) Patent No.: US 6,976,913 B2
(45) Date of Patent: Dec. 20, 2005

(54) CROP CHOPPER ARRANGEMENTS FOR AGRICULTURAL MACHINERY

(75) Inventors: Frank R. G. Duquesne, Zwevegem (BE); Marc R. M. Jonckheere, Snellegem (BE); Thierry E. G. Devriese, Sint-Andries (BE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/464,676

(22) Filed: Jun. 18, 2003

(65) Prior Publication Data

US 2004/0053652 A1 Mar. 18, 2004

(30) Foreign Application Priority Data

Jun. 19, 2002 (BE) .................................... 0214086

(51) Int. Cl.[7] ........................................... A01F 12/40
(52) U.S. Cl. ..................... 460/111; 460/901; 460/112
(58) Field of Search ...................... 460/111, 112, 901; 56/500; 239/650

(56) References Cited

U.S. PATENT DOCUMENTS

| | | | | |
|---|---|---|---|---|
| 2,708,582 A | * | 5/1955 | Adams | 239/650 |
| 3,350,017 A | * | 10/1967 | Howell et al. | 239/660 |
| 5,569,081 A | * | 10/1996 | Baumgarten et al. | 460/112 |
| 5,928,080 A | * | 7/1999 | Jakobi | 460/112 |
| 6,331,142 B1 | * | 12/2001 | Bischoff | 460/112 |
| 6,699,121 B2 | * | 3/2004 | Bognar et al. | 460/112 |
| 6,729,953 B2 | * | 5/2004 | Bueermann | 460/112 |
| 2004/0043804 A1 | * | 3/2004 | Redekop | 460/112 |

FOREIGN PATENT DOCUMENTS

| | | | | |
|---|---|---|---|---|
| DE | 10064356 A1 | * | 7/2002 | .......... A01D 41/02 |
| EP | 0993764 A1 | | 4/2000 | |
| GB | 2009576 A | | 6/1979 | |
| WO | WO 00/78126 A1 | | 6/2000 | |

* cited by examiner

*Primary Examiner*—Meredith Petravick
(74) *Attorney, Agent, or Firm*—Rebecca Henkel; Brant T. Maurer

(57) ABSTRACT

A crop chopper arrangement generally comprises a discharge apparatus having an inlet adapted to receive chopped crop from a crop chopper for an agricultural machine. The arrangement further includes a row of guide vanes positioned substantially transversely to a longitudinal axis of the agricultural machine and adapted to spread out a flow of the chopped crop from the discharge apparatus in a direction substantially rearwards to a direction of travel of the agricultural machine. One or more of the guide vanes has a shape or configuration that is adapted to impart a predetermined deviation to at least a portion of a flow of chopped crop passing through said discharge apparatus. The shape or configuration of each guide vane is dependent on its transverse position in the row. This arrangement makes it possible to realize an even distribution of the chopped crop over the full width of the harvester header.

28 Claims, 9 Drawing Sheets

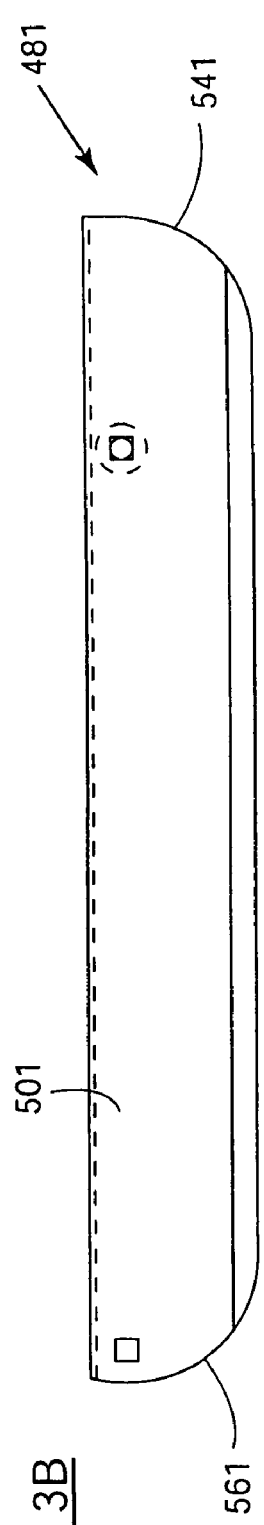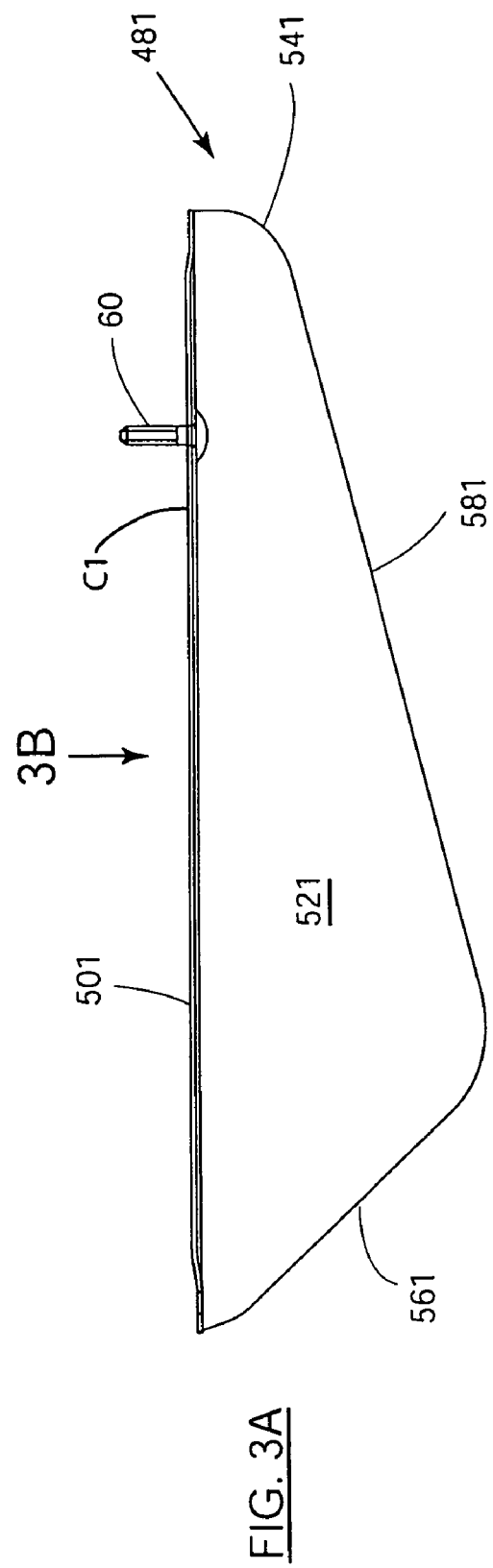
FIG. 3B
FIG. 3A

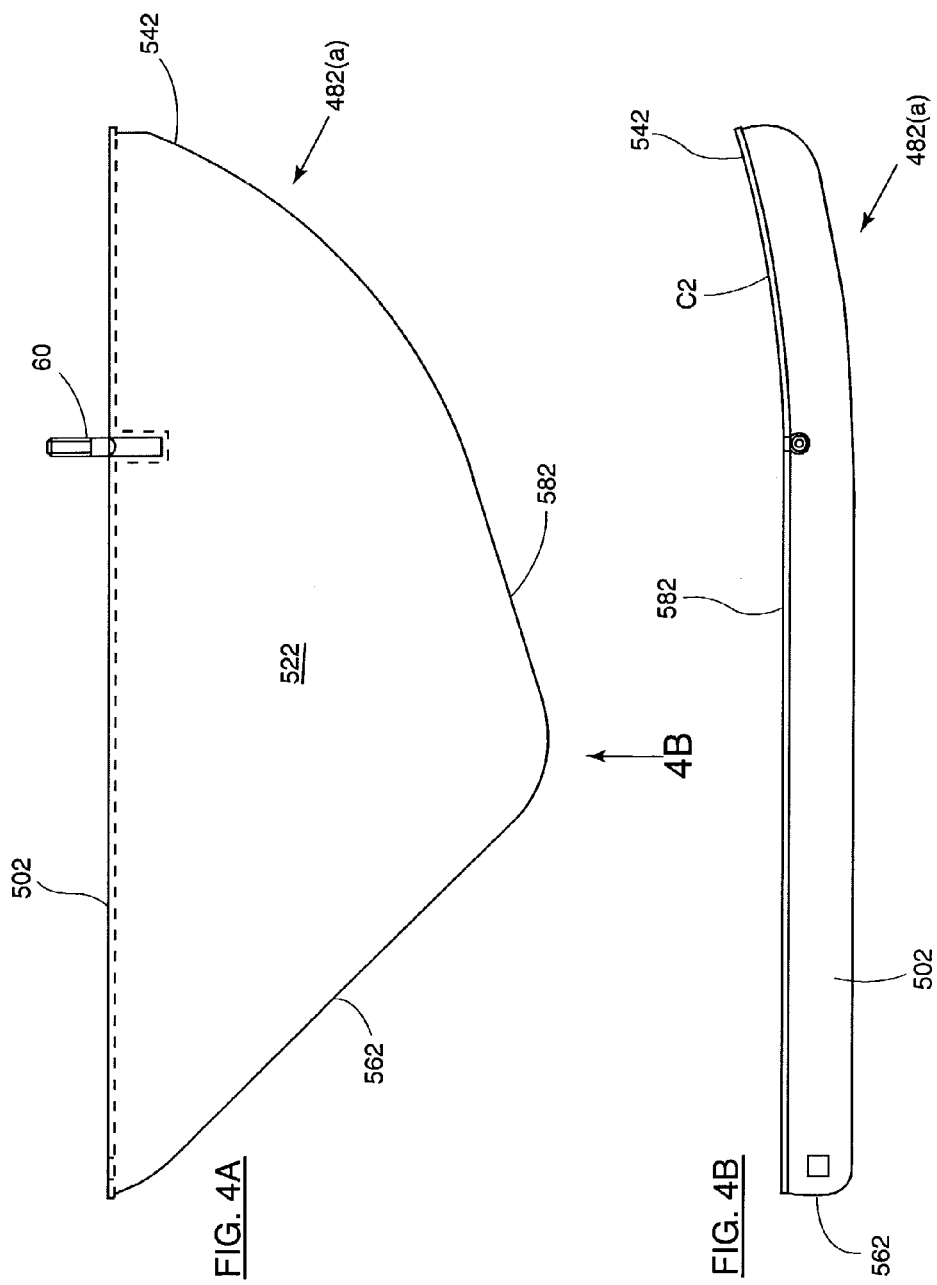

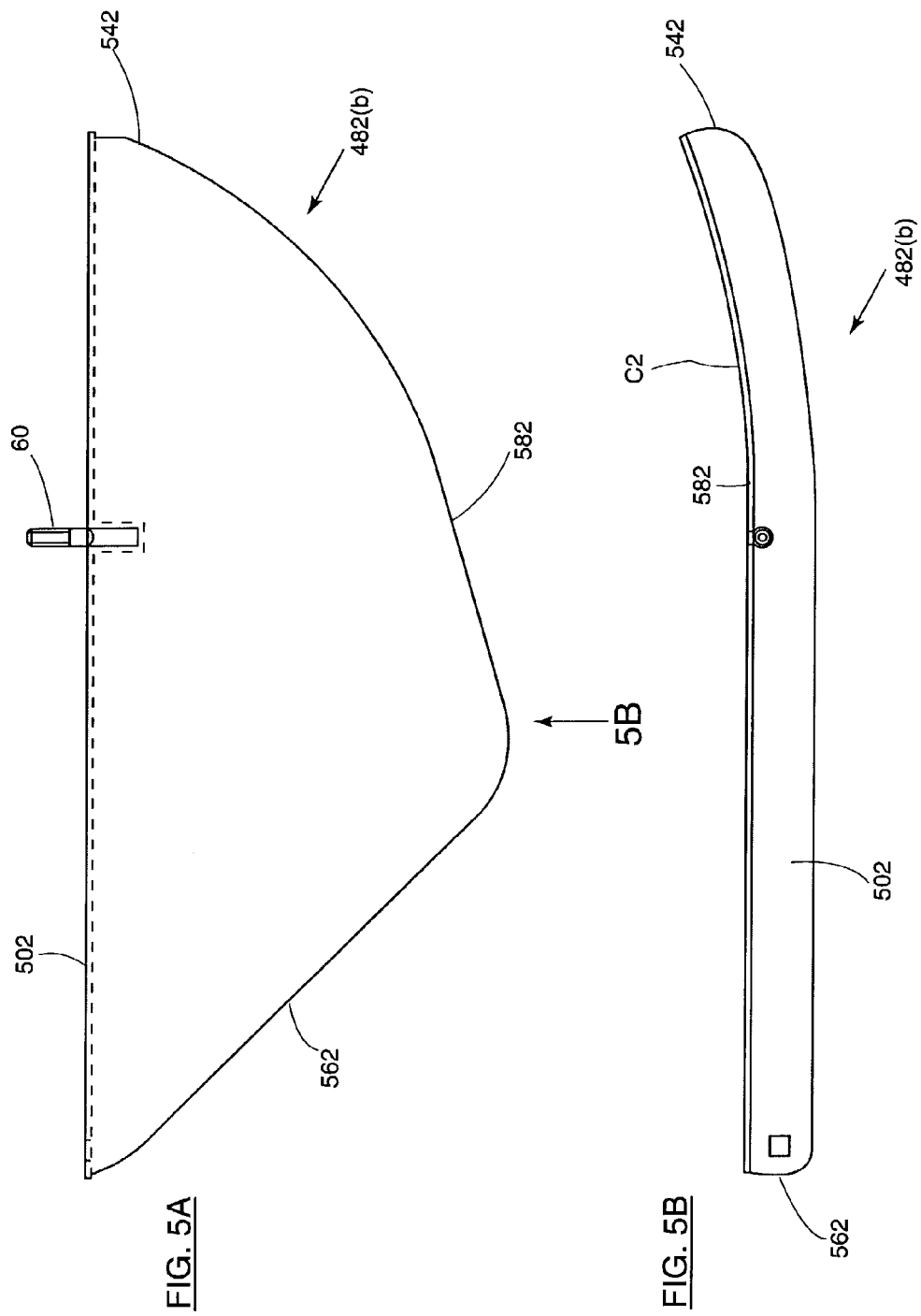

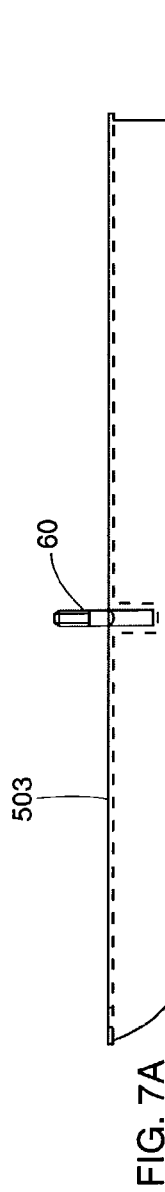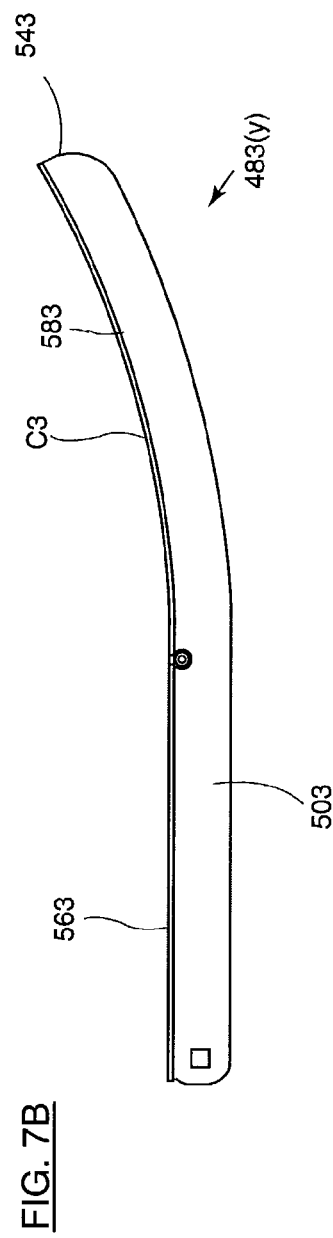
FIG. 7A
FIG. 7B

CROP CHOPPER ARRANGEMENTS FOR AGRICULTURAL MACHINERY

FIELD OF THE INVENTION

The present invention relates to crop chopper arrangements for agricultural machinery and in particular, but not exclusively, to the shape and configuration of guide vanes adapted to distribute chopped straw rearwards to the direction of travel of an equipped combine harvester.

BACKGROUND TO THE INVENTION

During operation of some agricultural machinery, crop residue is chopped up and deposited onto the ground rearward to the direction of travel of the machine. One example of such an arrangement is a straw chopping system of a combine harvester, in which straw is chopped and deposited in swathes rearwards to the direction of travel of the equipped vehicle, e.g. for later ploughing into the ground.

Some such agricultural machines, and in particular combine harvesters, work using a header attachment for gathering in crop. These header attachments, once deployed, may be significantly wider than the machine itself so as to achieve the widest crop collection window possible. By way of proportion, it is known by the applicants to provide a combine harvester of about 3 m wide with a header attachment having a width of cut from about 6 to 7 m depending on model, even approaching 10 meters in some cases.

If chopped straw is deposited rearwards in line with the combine body, it will form windrows or swathes that are similar in width to the body of the combine. Outboard of these swathes and up to the width of the header attachment, there are bare strips of ground. This gives rise to a number of problems, among which is the potential to disrupt even irrigation of the ground for at least the next crop generation. For example, if it rains before the swathes are worked into the ground and then the sun comes out, the deposited swathes will absorb water, which may evaporate in the sun and never reach the ground. There may also be other problems relating to uneven distribution in the ground of chopped crop residue after tilling. These and related problems may manifest themselves later by uneven crop growth in strips, which reduces efficiency of land use and is unsightly. Attempting to harvest in damp conditions or in rain only serves to exacerbate the problems, as the added weight of water in the chopped straw makes it fall down into ever more exaggerated narrow and piled up strips.

In order to try and alleviate these problems, various attempts have been made to distribute chopped straw more evenly across the window left behind by the width of cut of a combine header. One known approach is to provide a series of blades/guide vanes in the outlet of the straw chopper. These vanes may be angled to try and impart a spread to the exiting chopped straw.

One prior art straw chopper arrangement for combine harvesters is proposed in GB-2165732. In this arrangement, vanes are provided inside a discharge hood of a straw chopper mechanism in the form of guide plates. These guide plates are inclined outwardly towards their respective sides of the chopper hood with respect to the longitudinal axis of the combine. The guide plates are fixed in position in the hood that, among other things, may not be very efficient in windy conditions. With this arrangement, account cannot therefore be taken of wind causing drifting of the deposited chopped straw. In addition, the ends of the guide plates are substantially vertical and straw leaving such blades is projected in tunneled streams. While a potential improvement over arrangements having no guide plates, the streamed output may result in several smaller swathes behind the combine harvester and subsequently lead to diminished but nevertheless still present problems of stripes in one or more subsequent generations of crop.

In U.S. Pat. No. 6,331,142B1, a further prior art arrangement is disclosed having guide vanes curved in the vertical plane. These vanes again provide a predetermined trajectory to ejected chopped straw, while means are provided to move the vanes manually in order to change the configuration of the vanes so as to try and fan out the streams of straw across the width of the window left by the header. In this case, the outlet end of the guide vanes is inclined at an angle of approximately 45°, such that the straw that passes along the upper region of the blade leaves the blade later than that passing along the lower portions. As the straw leaves the blade tangentially in each region, the angle provided to the trailing edge of the guide blades allegedly produces a fanning effect to the exiting streams of straw in an attempt to more evenly distribute it over the ground behind the combine harvester. In the event of a side wind causing drifting of deposited chopped straw, it would be necessary to manually set the configuration of the vanes at the end of each pass across the crop gathering area, or to accept a serious compromise in efficiency.

SUMMARY OF THE INVENTION

It is an object of the present invention to provide improved crop chopper arrangements for agricultural machinery and in particular, but not exclusively, to provide an improved guide vane arrangement used to distribute chopped crop residue rearwards to the direction of travel of an equipped combine harvester.

Accordingly, the present invention provides a crop chopper arrangement for an agricultural machine, said crop chopper comprising a discharge apparatus having an inlet adapted to receive chopped crop from a crop chopping means and a row of guide vanes that are positioned substantially transversely to a longitudinal axis of said agricultural machine and that are adapted to spread out a flow of said chopped crop from said discharge apparatus in a direction substantially opposite to the direction of travel of said agricultural machine, the or each said guide vane having a shape or configuration that is adapted to impart in use a predetermined deviation to at least a portion of a flow of chopped crop passing through said discharge apparatus and said shape or configuration of each said guide vane being dependent on its transverse position in said row.

This arrangement has the advantage that portions of a flow of chopped crop can be guided in a plurality of streams of differing concentration and/or focus to different portions of a crop gathering window as necessary to achieve a desired distribution when the crop reaches ground level.

Said shape or configuration may be defined at least in part by curvature of the or each said guide vane. Said shape or configuration may be defined at least in part by the form of an end portion of the or each said guide vane. The form of said end portion may be defined at least in part by a slope and curvature of a trailing edge of the or each said guide vane. Said shape or configuration may be defined at least in part by the height of a portion of the or each said guide vane.

A first type of guide vane may be positioned substantially centrally in said row around said longitudinal axis and the shape or configuration of said first type of guide vane may be adapted to divert a central portion of said flow about said longitudinal axis and to leave a portion of said central flow undiverted, whereby said central flow may be partially fanned out about said longitudinal axis. The height and positioning of said first type of guide vane may be such that only an upper or lower portion of said central flow is diverted and a respective lower or upper portion thereof is discharged substantially undiverted. An adjacent pair of said first type of guide vane may fan out said central flow by means of an expanding nozzle effect. Said first type of guide vane may be substantially straight along its length. Said first type of guide vane may be curved down a trailing edge thereof.

A second type of guide vane may be positioned laterally substantially midpoint either side of said longitudinal axis and adapted to receive flanking portions of said flow of chopped crop, the shape or configuration of said second type of guide vane forming said second group being adapted to divert a flanking portion of said flow of chopped crop laterally away from said longitudinal axis and at least partially away from an area of distribution of said central flow. The or each said second type of guide vane may be curved along at least part of its length and down a trailing edge thereof. A curvature of said trailing edge of a said second type of guide vane may be adapted to ensure that the length of path followed by chopped crop along said guide vane varies according to the height of its path along said guide vane, whereby tangential departure of said flow from said second type of guide vane at said trailing edge may be performed with at least partial fanning out of said chopped crop.

A third type of guide vane may be positioned to the outer sides of said row and the shape or configuration of said third type of guide vane may be adapted to concentrate a flow of said chopped crop into a substantially focussed stream directed towards outer extremities of a crop harvesting window. The or each said third type of guide vane may be curved along at least part of its length. The number and types of guide vanes in said row or the number of channels formed between said guide vanes may depend on a crop gathering or processing capacity of said agricultural machine. One or more of said guide vanes may be moveably connected to said discharge apparatus in such a manner that the configuration of said one or more guide vanes is variable. Said configuration may be variable in such a manner as to vary the distribution imparted to a stream of said chopped crop by said one or more moveable guide vanes, or by a channel formed therebetween. Said configuration may be variable by alteration of an angle by which said moveable guide vanes are inclined to a longitudinal axis of said agricultural machine.

Movement of the or each said moveable guide vane may be variable under remote control and may be substantially continuously variable. Movement of said one or more guide vanes may be performed by an actuator. Said actuator may comprise a linear actuator, e.g. of the type comprising an electric motor, preferably driving through reduction gearing. Movement of said one or more guide vanes may be performed under the control of a user. A variation to an angle of inclination from said longitudinal axis of a said moveable guide vane may be settable manually or automatically in dependence of changes of wind direction.

Advantageously, one type of adjustment, e.g. manual adjustment, may be used for adjusting the total width of the spreading pattern. This adjustment can be used to adapt the spreading to the width of the header attachment. Another type of adjustment, e.g. remote control, may be used for adjusting the general direction of the spreading pattern, e.g. for adjusting the spreading to changes of wind direction.

A plurality of moveable guide vanes may be connected together by a link means for swinging movement substantially in unison. Connection together of a plurality of said guide vanes may be performed in such a manner that angular swing of each said connected guide vane is proportional to its lateral distance from said longitudinal axis. The angular swing of any particular guide vane for a given movement of said link means may be greater the further outboard in said row that said particular guide vane is positioned.

Two or more guide vanes may be formed from a common starting shape, such as a common size and shape of stamping or pressing. For example, the third type of guide vane may comprise the common stamping or pressing and the second and first types of guide vanes may comprise chopped down versions of the third type of guide vane.

The present invention also provides an agricultural machine, such as a combine harvester, including a crop chopper according to the invention.

The present invention also provides a method of spreading chopped crop rearwards to the direction of travel of an agricultural machine, the method including guiding portions of a flow of chopped crop in a plurality of streams of different concentration and/or focus to different portions of a crop gathering window. The method may include forming and guiding said portions of flow using a crop chopper arrangement according to the invention.

BRIEF DESCRIPTION OF THE DRAWINGS

FIG. 3A is a side view of a first type of guide vane of the arrangement of FIG. 2;

FIG. 3B is a bottom view of the guide vane of FIG. 3A;

FIG. 4A is a side view of a first version of a second type of guide vane of the arrangement of FIG. 2;

FIG. 4B is a bottom view of the guide vane of FIG. 4A;

FIG. 5A is a side view of a second version of a second type of guide vane of the arrangement of FIG. 2;

FIG. 5B is a bottom view of the guide vane of FIG. 5A;

FIG. 7A is a side view of a second version of the third type of guide vane of the arrangement of FIG. 2;

FIG. 7B is a bottom view of the guide vane of FIG. 7A;

DETAILED DESCRIPTION OF A PREFERRED EMBODIMENT

The present invention will now be described with reference to certain embodiments and with reference to the above-mentioned drawings. Such description is by way of example only and the invention is not limited thereto. The drawings are schematic and the terms "front", "rear", "forward", "rearward", "transverse", "lateral", "right and "left" where used are determined with respect to the normal direction of movement and/or longitudinal axis of an agricultural machine in use. The specific but non-limiting examples discussed herein will concentrate on self-propelled combine harvesters, although it will be appreciated that similar arrangements may also be provided in other forms of agricultural crop gathering/processing machinery such as windrowers.

Figure 1:
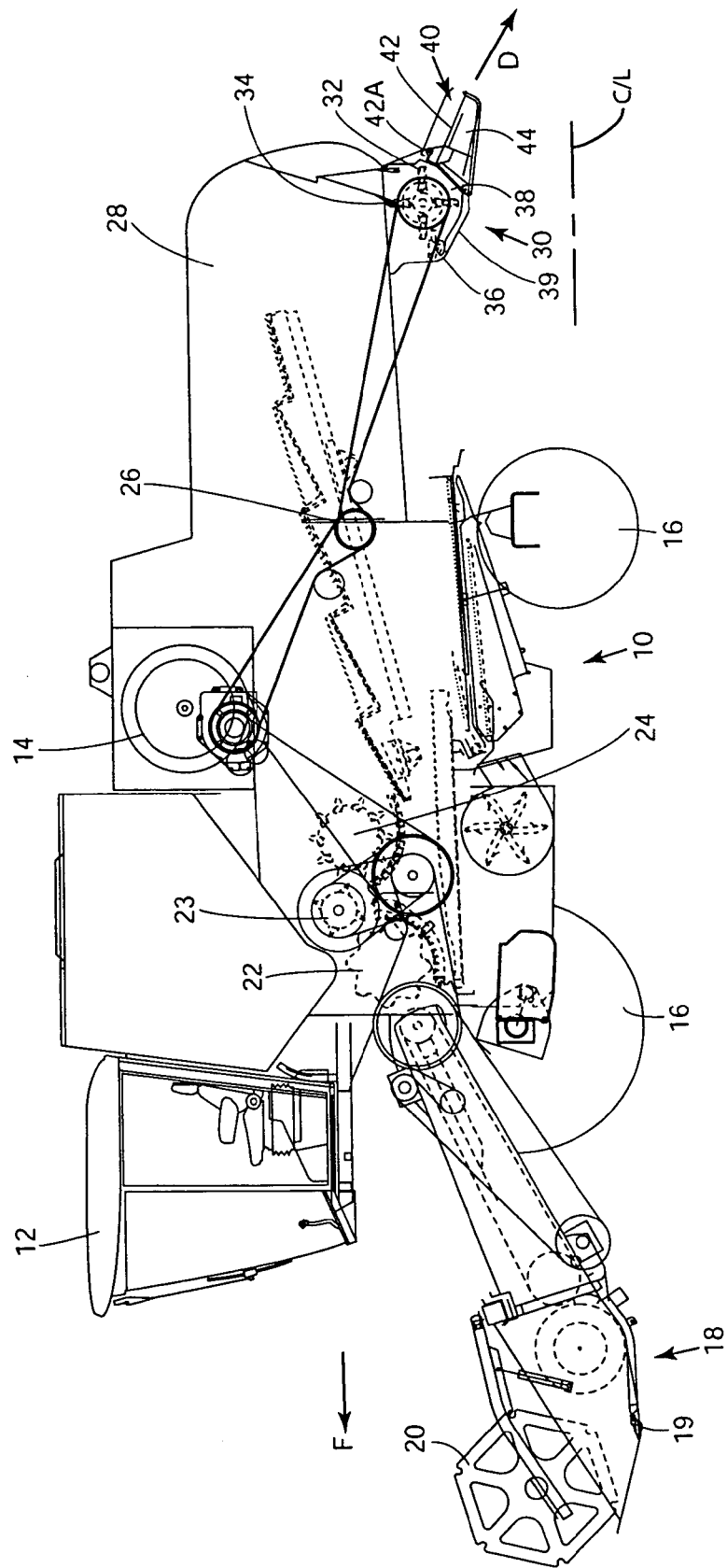
FIG. 1 is a schematic left hand side elevation of an agricultural machine including a crop chopper arrangement according to the present invention.

Referring to the drawings and in particular for the moment to FIG. 1, an agricultural harvesting machine in the form of a combine harvester 10 is provided with a user's cab 12 from which operation of the combine 10 may be controlled. The combine 10 is self-propelled by a prime mover in the form of an engine 14 drivingly connected to a set of wheels 16.

A header attachment 18 includes a cutterbar 19 for cutting stems of standing crop and a header reel 20 adapted to engage the crop during forward travel F of the combine 10 for supply of that gathered crop to a thresher 22, a beater 23 and a rotary separator 24 system for grain removal. After grain has been substantially removed, the crop residue, which may for example comprise largely straw and will be considered herein as such, is moved onto a set of juxtaposed straw walkers 26, illustrated by way of example as a five-step straw walker. The straw is conveyed along the straw walkers 26 into a straw hood 28 of the combine 10. The same straw walkers may be used on five and six straw walker combines; preferably only the overall width of the two straw walker crank shafts and their timing being different.

The straw hood 28 includes a straw chopper system 30 arranged in use to chop up the crop residue (e.g. straw) and to deposit it rearwards to the normal crop-gathering direction of travel F followed by the combine 10. The chopped straw is deposited along and about the center line C/L of the combine 10 in an even spread pattern as will now be described with further detailed explanation of the structure and function of the straw chopper system 30.

The straw chopper 30 includes a chopper drum 32 that is equipped with a series of knives 34 (preferably moveable) and that is adapted to rotate rapidly counter-clockwise as viewed from the left hand side elevation of the combine 10. In this manner, the crop residue/straw is drawn in by the drum and knives 32, 34 and chopped up against and between a series of stationary counter-knives 36. The chopped straw is then flung out of the chopping section 32, 34, 36 substantially tangentially to the point of departure 38 of the knives 34 from the housing 39 and into a discharge apparatus 40.

The discharge apparatus 40 comprises a flat metal cover panel 42 that extends across the width of the exit region of the straw chopper housing 39 and that covers a guide vane assembly 44. The cover panel 42 is pivoted downwards about an axis 42A substantially horizontal to the ground during normal operation and may be pivoted upwards to expose the guide vane assembly 44 and to allow access to the chopper knives for servicing and replacement. The detailed structure and operation of the guide vane assembly 44 will now be described with particular reference also to FIGS. 2 to 7B.

Figure 2:
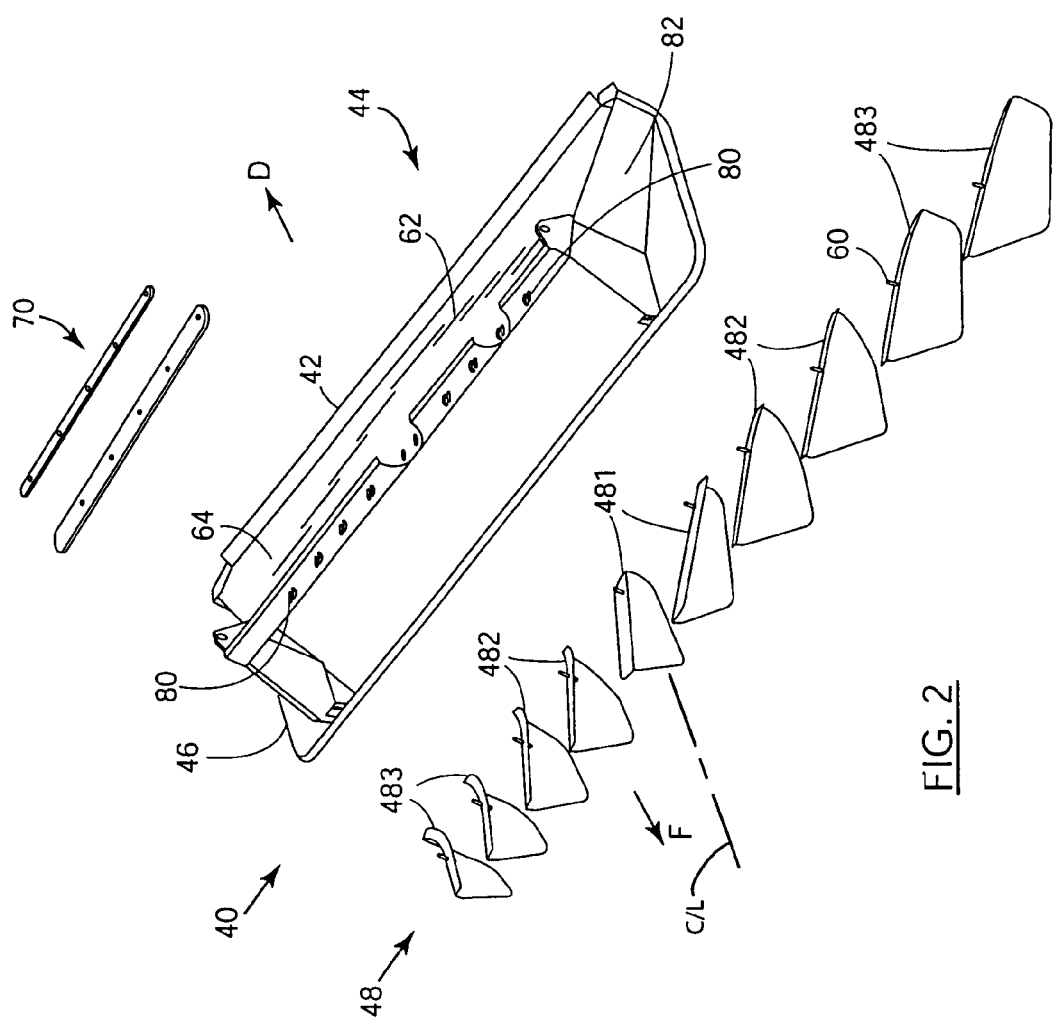
FIG. 2 is a rear portion of a crop chopper of the machine of FIG. 1 illustrated in perspective view in a disassembled form.
Figures 6A, 6B:
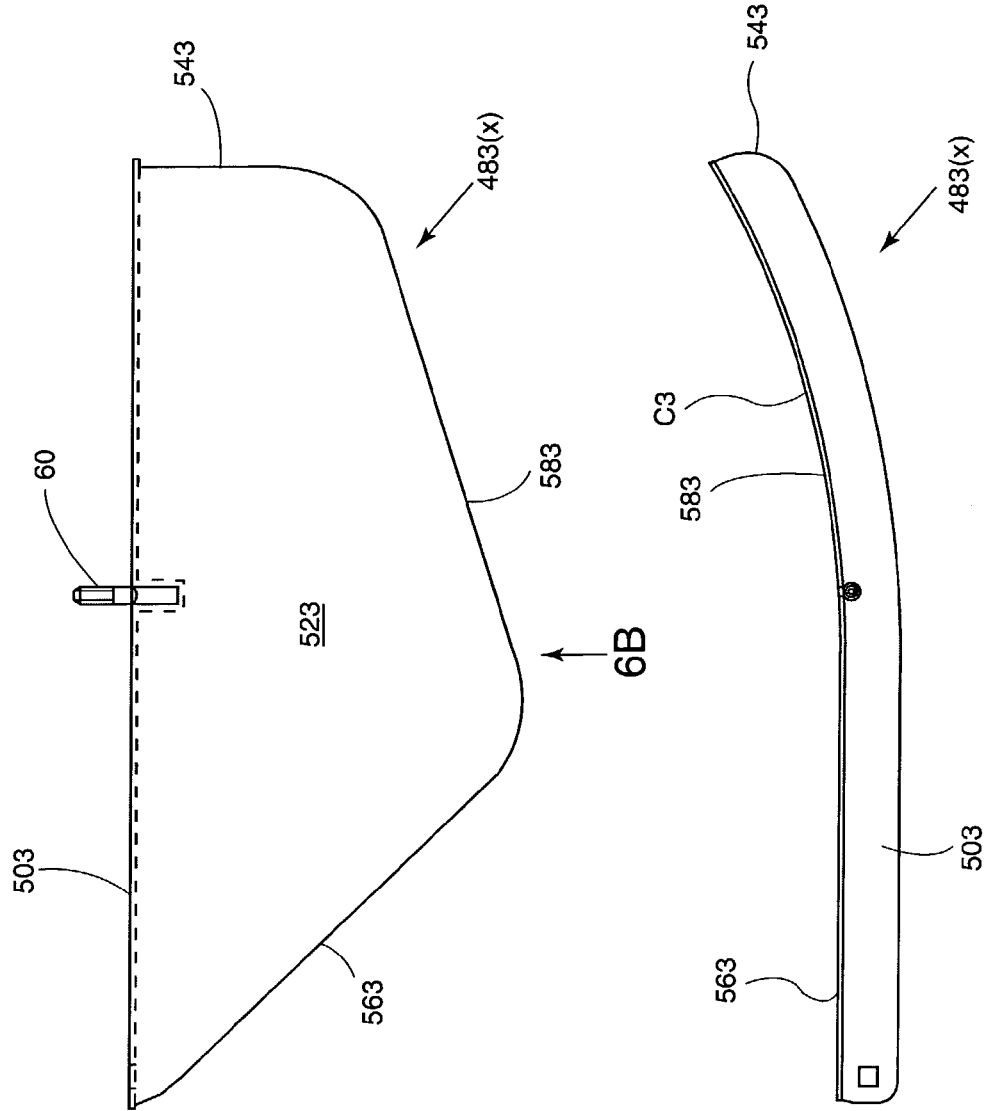
FIG. 6A is a side view of a first version of a third type of guide vane of the arrangement of FIG. 2.
FIG. 6B is a bottom view of the guide vane of FIG. 6A.

In FIG. 2, the guide vane assembly 44 is illustrated in the form of an assembly drawing and comprises a support structure 46 which supports a row of guide vanes 48 moveably connected therethrough to a link mechanism 70. In use, chopped crop residue/straw is discharged through the discharge apparatus 40 generally rearwards and preferably also groundwards in relation to the crop gathering direction of travel F of the combine 10. This discharge is indicated by the arrow D in FIG. 2. The shape and configuration of the guide vanes forming the row 48 and the channels defined therebetween imparts a predetermined distribution to the discharge D, this predetermined distribution comprising a spread pattern discussed further below in detail with particular reference to FIG. 8.

The row of guide vanes 48 comprises a plurality of different types of guide vane, each of whose shape and configuration depends on its position in the row 48. Their distribution in the row 48 may be seen in plan view in FIG. 8, in which the number, relative positioning and/or grouping of the guide vanes in the row 48 can be considered as a mirror image either side of the center-line C/L of the combine 10. For convenience and best clarity in explanation, each guide vane forming the row 48 may be considered to fall into one of three types: type 1, type 2 and type 3. In the exemplary embodiment illustrated by way of example in FIG. 2, all three types of guide vane are employed and they are covered individually and in detail in their variations in FIGS. 3A to 7B.

Figure 8:
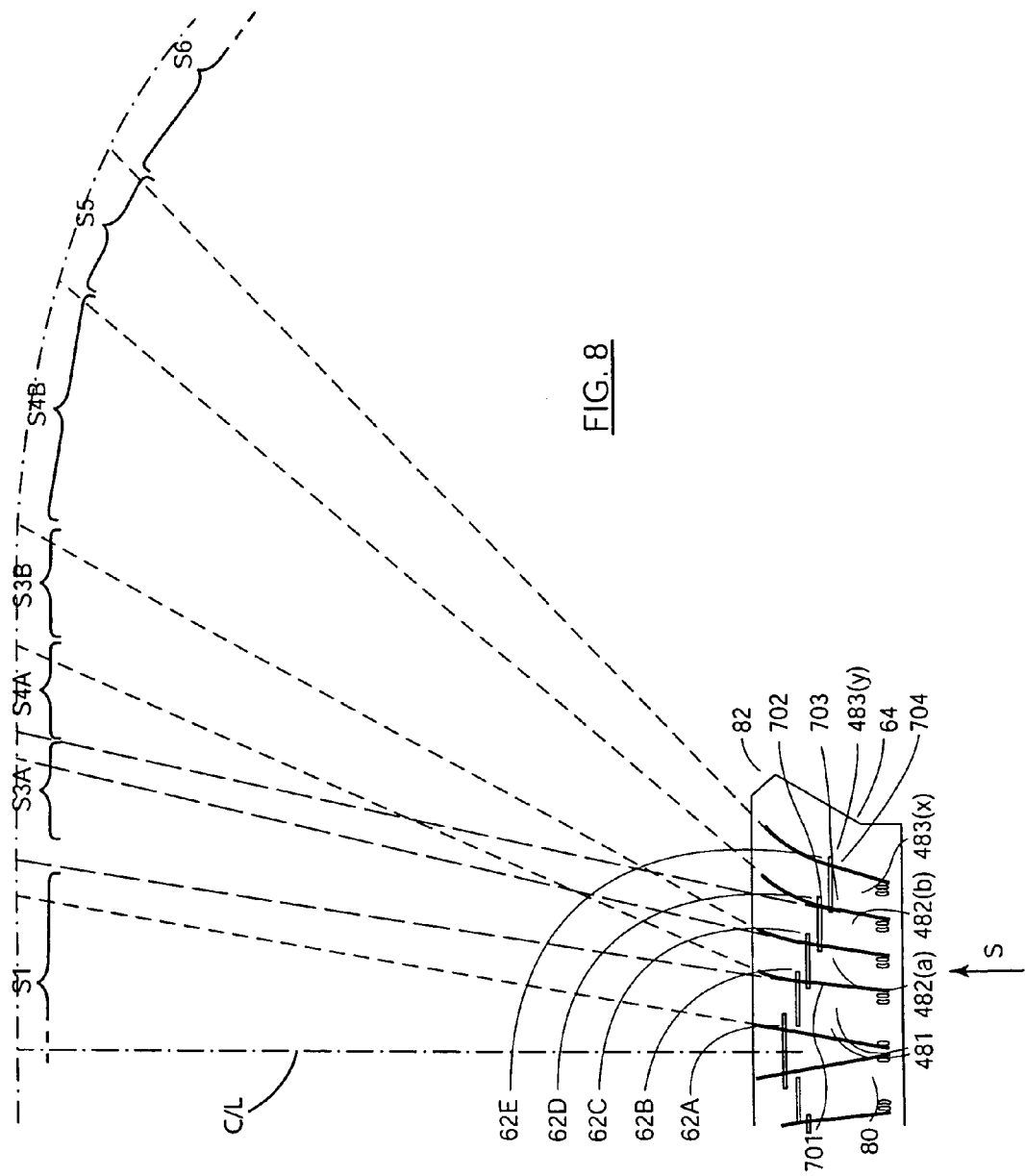
FIG. 8 is a plan view of part of the arrangement of FIG. 2 and an associated distribution pattern of chopped crop residue passed through that arrangement in use.

Within the different types of guide vanes, type 1 guide vanes 481 are positioned either side of the center line C/L of the combine 10 and in FIGS. 8 and 2 by way of illustration a pair are employed. Groups of type 2 guide vanes 482 are positioned in a side-by-side relationship in the midrange of the row 48, i.e. substantially midpoint in the row 48 either side of the longitudinal axis C/L of the combine 10. Groups of type 3 guide vanes 483 are positioned individually or in side-by-side relationships to the outer ends of the row 48, i.e. outboard of the type 2 guide vanes 482.

It will be appreciated that variations may be made to the number and grouping of the different guide vane types 1, 2, 3 used and to the spacing and number of any channels formed therebetween. Such variation may in particular depend on the width of the straw hood 28 and the width of the header attachment 18 of the particular agricultural machine in question. For example, in the case of a combine 10 according to the present embodiment, the width of the combine 10 may be viewed in terms of the number of straw walkers 26 it has. A five straw-walker combine may have eight guide vanes with only one type 3 guide vane 483 outboard of the row 48 on each side, whereas a six straw-walker combine 10 may have two type 3 guide vanes 483 each side, as illustrated in FIGS. 2 and 8 and making a total of ten guide vanes in the row 48.

The guide vanes 481, 482, 483 are preferably all formed out of similar substantially planar sheets or plate material such as mild steel, e.g. as QSTE220 steel. The curved vanes 482, 483 and possibly also the straight vanes 481 are formed from a common pressing or stamping. In a first step the border of the unbent sheet is cut out of the steel plate. In a second step the upper edge and a possible curvature is applied to the flat sheet. An initial curved shape may be formed in accordance with the profile of the type 3 guide vanes 483, which can be seen in two versions in FIGS. 7A, 7B, 6A and 6B. The type 3 guide vanes 483 have the largest surface area of the three types and the types 2 and 1 guide vanes 482, 481 are preferably formed out of initial stampings/pressings used unmodified to produce the major part of the type 3 guide vanes 483. Dedicated tooling may be required for applying the curvature to the rear ends of the type 2 and 3 guide vanes 482, 483. As both types have an end portion with the same radius of curvature, a single press die can suffice. It is only necessary to relocate an abutment on the tool to switch between the vane types, as the curved end portions have different lengths.

Type 2 guide vanes 482 have the second largest surface area and are illustrated with particular reference to two versions in FIGS. 5A, 5B, 4A and 4B. Type 1 guide vanes 481 have the smallest surface area and are illustrated with particular reference to FIG. 3A and 3B. Both type 2 and type 1 guide vanes 482, 481 are essentially cut down versions of a pressing/stamping of a type 3 guide vane 483. In this manner, maximum use can be made of the large investment in press tools necessary to form such articles. Type 3 and type 2 guides vanes 483 are preferably provided with a curved portion along at least part of their length, this curvature C3, C2 being formed simultaneously with the initial stamping. The curvature C3, C2 is formed at the rear end of the guide vanes 483, 482 and is adapted to deflect/divert at least a portion of chopped straw sideways during dispersal of a stream thereof through the straw chopper 30, as will be described below in greater detail with particular reference to FIG. 8. From the bottom views of FIGS. 7B, 6B, 5B and 4B of respectively the type 3 and type 2 guide vanes 483, 482, it can be seen that the sweep of their respective curvatures C3, C2 is the same for both types 3 and 2 guide vanes 483, 482 although the curved portion C2 of the type 2 guide vanes 482 can be seen to be shortened in length in comparison to that of the type 3 guide vanes 483. Such shortening is the result of the overall shortening of the type 2 guide vanes 482 in comparison to the type 3 guide vanes 483.

The type 1 guide vanes 481 may or may not also include a curvature C1. In case a curvature is used, it may be from the same pressing as the types 3 and 2 guide vanes 483, 482. Where no curvature is applied, standard bending tooling will suffice. In the embodiment illustrated with reference to FIG. 3B, the type 1 guide vanes are so shortened that all the curved portion of the starting pressing has been lopped off, such that the type 1 guide vanes 481 are effectively substantially straight. The curvature C3, C2, C1 in each case is preferably shallow enough to have only a minimal effect on reducing the velocity of chopped straw passing therealong.

In the side elevations of FIGS. 3A, 4A, 5A, 6A and 7A, further differences can be seen between the three types of guide vanes 483, 482, 481 in their finished form. Each guide vane 483, 482, 481 in the row 48 preferably has a substantially straight upper edge 503, 502, 501 and this forms an upper boundary to the working surface 523, 522, 521 is further bounded by a trailing edge 543, 542, 541, a leading edge 563, 562, 561 and a lower edge 583, 582, 581.

The leading edges 561, 562, 563 of all three types 3, 2, 1 of guide vanes 483, 482, 481 face the chopper drum 32 and preferably have more or less the same slope, e.g. at an angle of about 70° to the direction of the flow of chopped straw/crop residue that is leaving the housing 39.

In similar fashion, the lower edges 583, 582, 581 of each guide vane 483, 482, 481 preferably all form the same angle with the ground, e.g. about 5° when in use for distribution. The height of each guide vane 483, 482, 481 is defined by the distance between the upper 503, 502, 501 and lower edges 583, 582, 581. The type 1 guide vanes 481 may be somewhat lower in height than their flanking types 2 and 3 guide vanes 482, 483 and preferably therefore only affects part (e.g. half) of the stream of chopped straw delivered to these vanes.

In the embodiment illustrated, the row 48 of guide vanes 483, 482, 481 is suspended from the support structure 46. It will be appreciated, however, that such vanes 483, 482, 481 could instead be upstanding from a lower support structure or mixed between depending and upstanding guide vanes in other embodiments (none illustrated). Height of the type 1 vanes is not limited to about half of the stream of chopped straw and may be significantly more or less than half, the preferred main feature here being that the centrally disposed type 1 guide vanes 481 leave at least part of a central portion of the stream undiverted such that it can be discharged straight out the back of the combine 10 and head groundwards D to cover that region directly behind the combine 10.

The trailing edges 543, 542, 541 may be curved in the vertical plane and provide a line of departure from the guide vanes 483, 482, 481 for distribution of the stream of chopped straw rearwards, in which the chopped straw leaving the vanes 483, 482, 481 leaves it later and at a greater angle the higher up it is passing. In this manner, the diverted chopped straw is at least partially fanned out. It can be noted that the trailing edge 541 of the type 1 guide vanes 481 is sharper or more pointed than that of the trailing edge 542 of the type 2 guide vanes, this being largely due to their lower height. In turn the trailing edge 542 of the type 2 guide vanes 482 is sharper than that of the type 3 guide vanes 483, whose trailing edge 543 is the deepest of the three types 1, 2, 3 and substantially perpendicular to the upper edge 503. The increased sharpness/taper of the type 2 trailing edge 542 in comparison to the trailing edge 543 of the type 3 provides to a stream of chopped straw a greater fanning out or spreading out effect. The lower edges 583, 582, 581 run in a substantially straight line from the bottom of the leading edges 563, 562, 561 to the lower reaches of this curvature of the trailing edges 543, 542, 541.

The differences between the types 1, 2, 3 of guide vane 483, 482, 481 can therefore be seen to include the height, the length, the working surface area 523, 522, 521, the proportion of the curved area and the form of the trailing edge 543, 542, 541. It can therefore be seen that these parameters may largely dictate any particular guide vane's position in the row 48 and, as will be seen from FIG. 8, its operation.

Along the upper edge 503, 502, 501 and towards the trailing edge 543, 542, 541, each guide vane 483, 482, 481 is provided with a swinging means including an upstanding pin 60. The pin 60 is free to ride in one of a series 62 of transverse guide slots 62A, 62B, 62C, 62D, 62E defined crossways in an upper surface 64 of the support structure 46. The full series of guide slots 62 can be seen in perspective in FIG. 2 and a plan view of one side in FIG. 8, the opposite side in FIG. 8 preferably being a mirror image. The slots 62 step forwards along the longitudinal axis C/L of the combine 10, the most rearwards slot 62A accommodating the pins 60 of the type 1 guide vanes 481. Stepped forwards from that slot 62A and flanking it is a pair of second slots 62B, which accommodate the pins 60 of an associated first version (a) of the type 2 guide vanes 482. In similar fashion, stepped forwards from the second slots 62B and flanking them are a pair of third slots 62C, which accommodate the pins 60 of associated second versions (b) of the type 2 guide vanes 482. The difference between the first (a) and second (b) versions of the type 2 guide vanes 482 is that the pins 60 of the second version (b) are stepped towards the leading edge 562 of the guide vane 482(b) concerned, such that they match the forwards disposition of the third slot 62C in comparison with the second slot 62B along the combine longitudinal axis C/L. In similar fashion, fourth slots 62D flank the third slots 62C and accommodate pins 60 of a first version (x) of the type 3 guide vanes 483. These fourth slots 62D are in turn flanked by fifth slots 62E, which accommodate the pins 60 of a second version (y) of the type 3 guide vanes 483. Like the different versions (a), (b) of the type 2 guide vanes 482, the pin of the second version (y) of the type 3 guide vane 483 is stepped towards the leading edge 563 of its guide vane 483(y) with respect to the position of the pin on the inboard and first version (x) of the type 3 guide vane 483. In embodiments other than the non-limiting one illustrated by way of example only, the number of each type 3, 2, 1 of guide vane 483, 482, 481 may vary, as may therefore the associated numbers of slots 62 and versions (a, b, x, y) of each type 3, 2, 1 of guide vane 483, 482, 483.

Towards the leading edges 563, 562, 561, each guide vane 483, 482, 481 is pivotally attached to the support structure 46 and depends therefrom. Individual pivotal attachment points 80 are preferably made in line abreast transverse to the support structure 46. The spacing between the pivot points 80 is preferably laterally fixed and defines the width of the entrance to any channel defined between neighboring guide vanes 483, 482, 481. In the embodiment illustrated, it can be noted that the separation between the two type 1 guide vanes 481 is significantly more narrow at their pivot points 80 than the separation between those guide vanes 481 and their neighboring/flanking type 2 guide vanes 482. The separation of the type 1 guide vanes 481 at their trailing edges 541 is significantly wider than the separation of their leading edges at the pivot points 80, such that the type 1 guide vanes define an expanding channel/nozzle to the stream of chopped straw. The channel 701 defined between the type 1 guide vanes 481 and the flanking type 2 guide vanes 482 is wider than channels 702, 703, 704 defined respectively between guide vanes 482, 483 of the type 2 to type 2, type 2 to type 3 and type 3 to type 3. The channel 705 between the type 3 guide vane 483(y) and the side wall 82 of the support structure 46 is wider than all previous channels.

Figure 9:
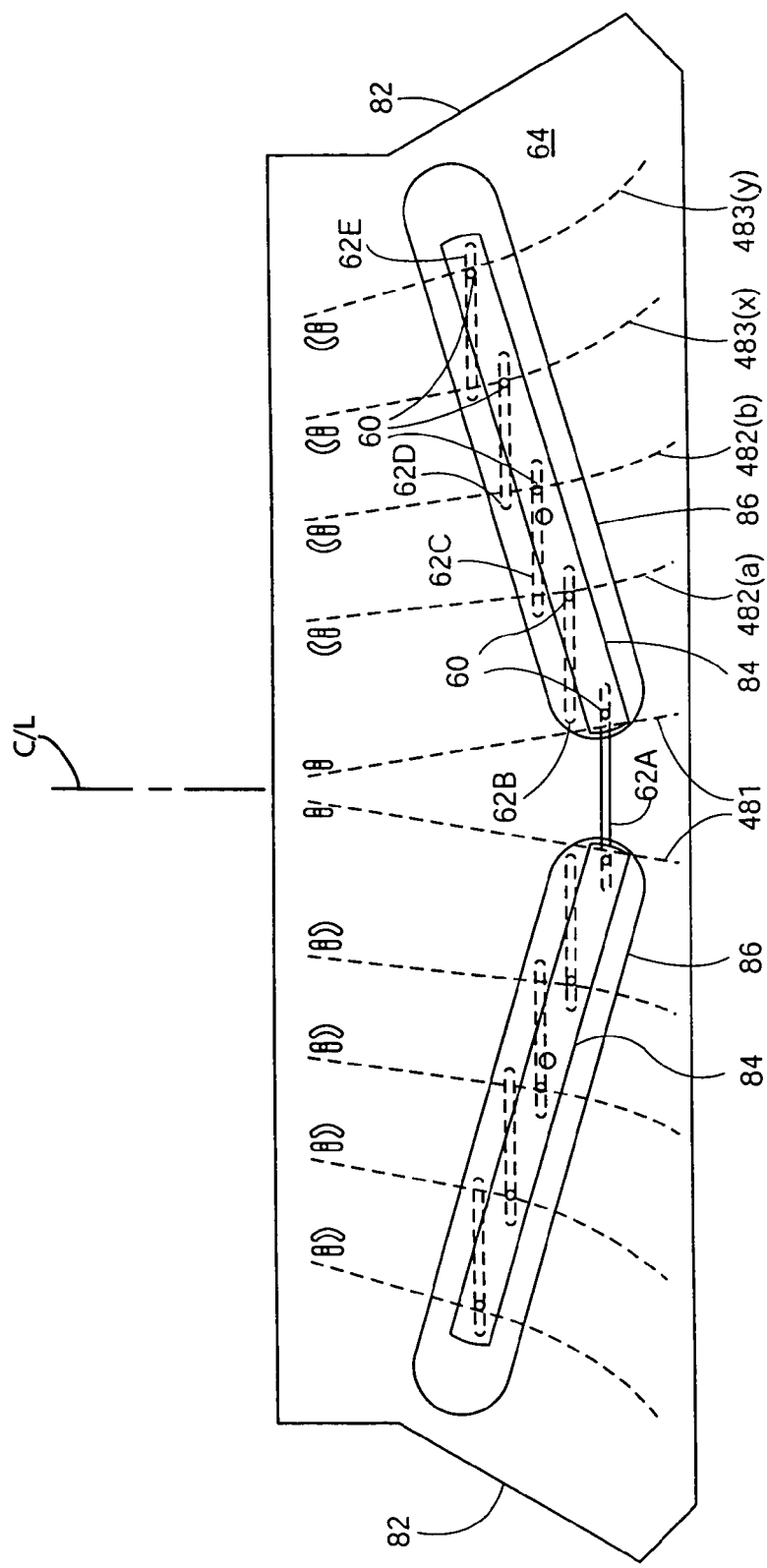
FIG. 9 is a top view of the rear portion of FIG. 2.

Turning now to the link mechanism 70 shown in FIG. 9, the link mechanism 70 is adapted to connect the pins 60 together in a fixed relationship such that they can be moved back and forth along the slots 62, pivoting about the pivot points 80 in a swinging action. The pins 60 are received in a transverse guide member 84 which is installed on top of the upper surface 64. They are connected to the guide member 84 by lock nuts. In this manner, the guide vanes 483, 482, 481 can be swiveled/swung back and forth sideways so as to vary the configuration of the guide vanes 483, 482, 481 and therefore to at least partially influence the distribution pattern of the stream of chopped straw deposited rearwards of the combine 10. This allows an operator to take account of side wind which, if left uncompensated, might cause drifting and therefore uneven distribution and may also drift chopped straw into neighboring unharvested crop potentially blocking the combine 10 when it reaches that section for gathering purposes. A plastic cover 86 may be arranged between the upper surface 64 and the guide member 84 for closing the portion of the transverse slots 62 which is not covered by the guide member itself. The cover 86 may be movable with the guide member 84

Movement of the link mechanism 70 may implemented by remote control, e.g. from the user cab 12. Such remote control may be embodied in the form of an actuator, e.g. a linear actuator of the type comprising a motor, such as for example an electric motor driving through reduction gearing. To save on component costs, it may be found possible to implement this feature without a custom motor, e.g. by using a commercially available linear actuator which uses a spindle to convert the motor rotation into a linear movement.

Turning now to FIG. 8 in particular, the effects and improvements of applying the present invention are well illustrated schematically for one side of the discharge apparatus 40. The other side may be considered a mirror image in structure and in distribution of a stream of chopped straw S entering and/or passing below the row 48 of guide vanes 483, 482, 481. The shape of the guide vanes 483, 482, 481 is defined by their edges, working area, curved area and curvature, while the manner in which they are configured relates to the physical restrictions such as the spacing in between and also to dynamic factors such as their position in the slots at any one time and therefore their substantially instantaneous angle with respect to the longitudinal axis C/L of the combine 10.

The shape and configuration of the type 1 guide vanes 481 is adapted to ensure that they act as a diffuser nozzle to the upper half of the stream S and divert it such that it spreads out sideways S1 over and laterally beyond an undiverted portion of the stream S that passes under the type 1 blades 81 and the stream between the type 1 vanes and their flanking type 2 vanes may resemble a converging beam. The shape and configuration of the guide vanes 482 is adapted to ensure that a stream leaving the substantially parallel channel defined between the type 2 guide vanes 482 fans out between two extremes. There is an undiverted portion S3A which leaves the lower portion of the guide vanes in a straight line and spreads out as it gets further from the trailing edges 542. This portion S3A is angled away from the longitudinal axis C/L of the combine 10. There is also a diverted portion S3B which is diverted further sideways than the first portion S3A, the diversion being imparted by the curvature of the top portion of guide vane 482. A similar spreading effect is achieved in similar fashion through the channel defined between the type 2 and type 3 guide vanes 483, 482 and undiverted S4A and diverted S4B streams are produced, as can be seen with particular reference to FIGS. 8 and 9.

In the case of chopped straw leaving the trailing edges 541, 542 of at least the type 1 and type 2 guide vanes 482, the curvature of that trailing edge means that the straw that passes along the upper region of the blade leaves the blade later than that passing along the lower portions. This is similar to the arrangement of U.S. Pat. No. 6,331,142B1, but the curvature of the present invention provides better and more efficient fanning than it would if those trailing edges 541, 542 were straight as proposed in this US patent.

In the particular case of the type 3 guide vanes 483, the shape and configuration of the guide vanes 483 is adapted to ensure that the streams S5 and S6 emitted from the channel defined between them and between the outer guide vane 483(y) and the side wall 82 is concentrated into a substantially focussed streams directed towards the outer extremities of the crop harvesting window achieved by the combine 10. In this manner, the outer streams S5 and S6 of chopped straw may reach the outer extremities of the crop harvesting window in sufficient concentration to achieve in combination with the other streams an even crop residue distribution across the full width of that window. The uniformity of distribution helps ensure that there is minimal chance of clogging of a following tillage tool such as a plough. In other circumstances, the uniformity of distribution achieved by the present invention ensures that a subsequent tilling operation does not result in uneven ground quality or irrigation.

While the present invention has been particularly shown and described with respect to a preferred embodiment, it will be understood by those skilled in the art that changes in form and detail may be made without departing from the scope and spirit of the invention. For example, it will be appreciated that many features not essential to the present invention may be substituted or supplemented by functional equivalents. One example of such a substitution might be to replace the straw walkers by a set of rotary separator conveyors.

What is claimed is:

1. A crop chopper for an agricultural machine having a direction of travel, comprising:
   an inlet adapted to receive a flow of a chopped crop from a crop chopper; and
   a plurality of guide vanes positioned to spread out the flow of the chopped crop received from the inlet,
   wherein the plurality of guide vanes includes a first type of guide vane having a first trailing edge and a second type of guide vane having a second trailing edge, the first type of guide vane positioned at a first lateral distance from a longitudinal axis of the machine and the second type of guide vane positioned at a second distance from the longitudinal axis of the machine different from the first distance, wherein the first trailing edge of the first type of guide vane is generally aligned straight at a first slope, and the second trailing edge of the second guide vane is generally aligned straight at a second slope different than the first slope.

2. A crop chopper according to claim 1, wherein each of said guide vanes includes a shape or configuration, wherein said shape or configuration is defined at least in part by a height of a portion of each said guide vane.

3. A crop chopper according to claim 1, wherein the first type of guide vane is positioned substantially centrally in said row around said longitudinal axis and the shape or configuration of said first type of guide vane is adapted to divert a central portion of said flow about said longitudinal axis and to leave a portion of said central flow undiverted, whereby said central flow is partially fanned out about said central axis.

4. A crop chopper according to claim 3, wherein the height and positioning of said first type of guide vane is such that only an upper or lower portion of said central flow is diverted and a respective lower or upper portion thereof is discharged substantially undiverted.

5. A crop chopper according to claim 3, wherein an adjacent pair of said first type of guide vane fans out said central flow by means of an expanding nozzle effect.

6. A crop chopper according to claim 3, wherein said first type of guide vane is substantially straight along its length.

7. A crop chopper according to claim 3, wherein the second type of guide vane is positioned laterally substantially midpoint either side of said central axis and adapted to receive flanking portions of said flow of chopped crop, the shape or configuration of said second type of guide vane forming said second group being adapted to divert a flanking portion of said flow of chopped crop laterally away from said longitudinal axis and at least partially away from an area of distribution of said central flow.

8. A crop chopper according to claim 7, wherein the second curvature of said second trailing edge of said second type of guide vane is adapted to ensure that the length of path followed by chopped crop along said second type of guide vane varies according to the height of its path along said second type of guide vane, whereby tangential departure of said flow from said second type of guide vane at said second trailing edge is performed with at least partial fanning out of said chopped crop.

9. A crop chopper according to claim 7, wherein a third type of guide vane is positioned to the outer sides of said row and the shape or configuration of said third type of guide vane is adapted to concentrate a flow of said chopped crop into a substantially focussed stream directed towards outer extremities of a crop harvesting window.

10. A crop chopper according to claim 9, wherein each said third type of guide vane is curved along at least part of its length.

11. A crop chopper according to any one of claim 3, wherein the number and types of guide vanes in said row or the number of channels formed between said guide vanes depends on a crop gathering or processing capacity of said agricultural machine.

12. A crop chopper according to claim 1, wherein at least one of said guide vanes is moveably connected to said discharge apparatus in such a manner that the configuration of said at least one guide vane is variable.

13. A crop chopper according to claim 12, wherein said configuration is variable in such a manner as to vary the distribution imparted to a stream of said chopped crop by said at least one moveable guide vane, or by a channel formed therebetween.

14. A crop chopper according to claim 12, wherein said configuration is variable by alteration of an angle by which said moveable guide vane is inclined to a longitudinal axis of said agricultural machine.

15. A crop chopper according to claim 12, wherein movement of each said moveable guide vane is variable under remote control.

16. A crop chopper according to claim 12, wherein movement of said at least one guide vane is performed by a linear actuator.

17. A crop chopper according to claim 16, wherein said actuator comprises an electric motor driving through reduction gearing.

18. A crop chopper according to claim 12, wherein movement of said at least one guide vane is performed under the control of a user.

19. A crop chopper according to claim 18, wherein a variation to an angle of inclination from said longitudinal axis of a said moveable guide vane is settable manually, a manual said user adjustment being adapted to adjust substantially a total width of spreading pattern.

20. A crop chopper according to claim 12, wherein a plurality of moveable guide vanes are connected together by a link for swinging movement substantially in unison.

21. A crop chopper according to claim 20, wherein connection together of a plurality of said guide vanes is performed in such a manner that angular swing of each said connected guide vane is proportional to its lateral distance from said longitudinal axis.

22. A crop chopper according to claim 21, wherein the angular swing of any particular guide vane for a given movement of said link is greater the further outboard in said row that said particular guide vane is positioned.

23. A crop chopper according to claim 9, wherein at least two types of guide vanes are formed from a common starting shape.

24. The crop chopper as recited in claim 9, wherein the third type of guide vane is shaped different than the second type of guide vane.

25. A crop chopper according to claim 1, wherein the first and second types of guide vanes each includes an upper edge substantially perpendicular to the first and second trailing edges.

26. A crop chopper arrangement for an agricultural machine having a direction of travel, comprising:
   an inlet adapted to receive a flow of a chopped crop from a crop chopper; and
   a plurality of guide vanes positioned to spread out the flow of the chopped crop received from the inlet,
   wherein one or more of the plurality of guide vanes includes a working surface generally bounded by an upper edge, a leading edge, a lower edge and a trailing edge, the upper edge generally defining an upper boundary of the working surface, the leading edge generally facing the crop chopper and generally aligned straight along a first slope with respect to vertical, the trailing edge generally aligned straight along a second slope leading to a curvature, and the lower edge is generally straight between a bottom of the leading edge and a lower point of the curvature of the trailing edge.

27. A method of spreading a flow of chopped crop substantially rearwards relative to a direction of travel of an agricultural machine, the method comprising the steps of:
receiving a flow of chopped material from a chopper; and
guiding portions of a flow of chopped crop in a plurality of streams of different concentration or focus to different portions of a crop gathering window as defined by a plurality of guide vanes, wherein the guiding step includes releasing one portion of the flow of chopped crop along a generally straight aligned first trailing edge of a first guide vane later than releasing another portion of the flow of chopped crop along a generally straight aligned second trailing edge of a second guide vane associated with a difference of a first slope of the generally straight aligned first trailing edge of the first guide vane relative to a second slope of the generally straight aligned second trailing edge of the second guide vane, the second guide vane positioned laterally outward from the first guide vane relative to a longitudinal axis of the agricultural machine.

28. The method according to claim 27, including forming and guiding said portions of flow using a crop chopper arrangement comprising a discharge apparatus having an inlet adapted to receive the flow of chopped crop from a crop chopping means and the plurality of guide vanes in a row that are positioned substantially transversely to the longitudinal axis of said agricultural machine and that are adapted to spread out the flow of said chopped crop from said discharge apparatus in the direction substantially rearwards to the direction of travel of said agricultural machine, wherein each said guide vane has a shape or configuration that is adapted to impart in use a predetermined deviation to at least a portion of a flow of chopped crop passing through said discharge apparatus and said shape or configuration of each said guide vane being dependent on its transverse position in said row.

* * * * *